C. H. BROCKMANN.
MOTOR DRIVEN VEHICLE.
APPLICATION FILED DEC. 22, 1916.
1,237,288.
Patented Aug. 21, 1917.
3 SHEETS—SHEET 3.
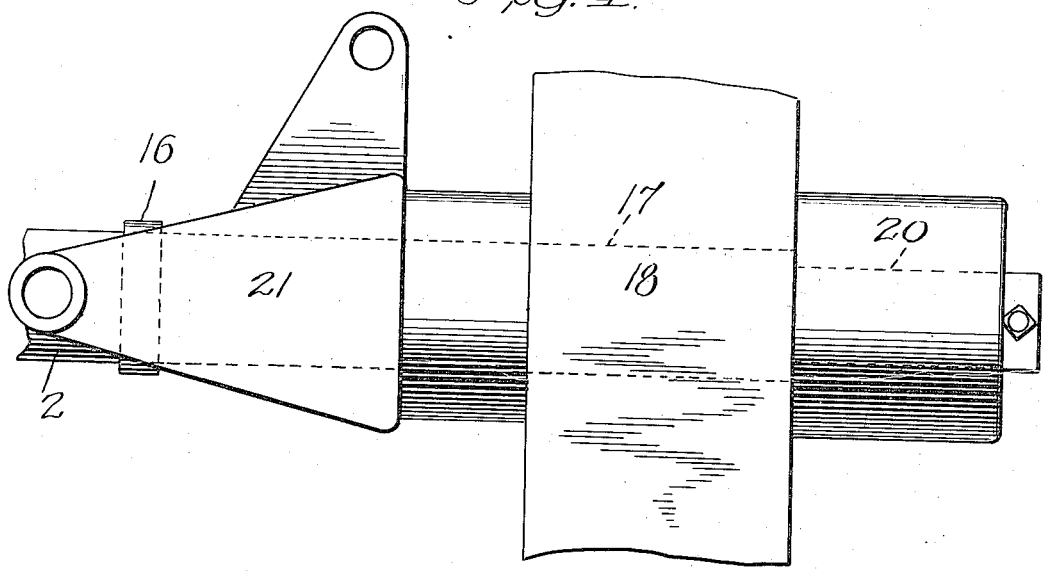
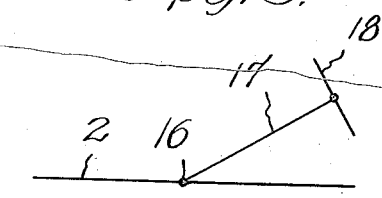
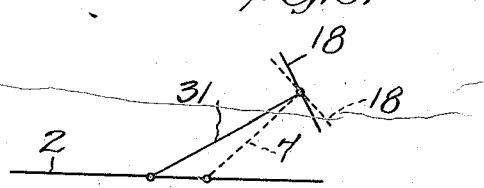
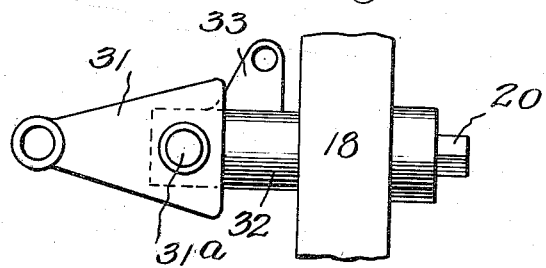
Witnesses:
Inventor:
C. H. Brockmann
By H. J. Sanders
Atty.

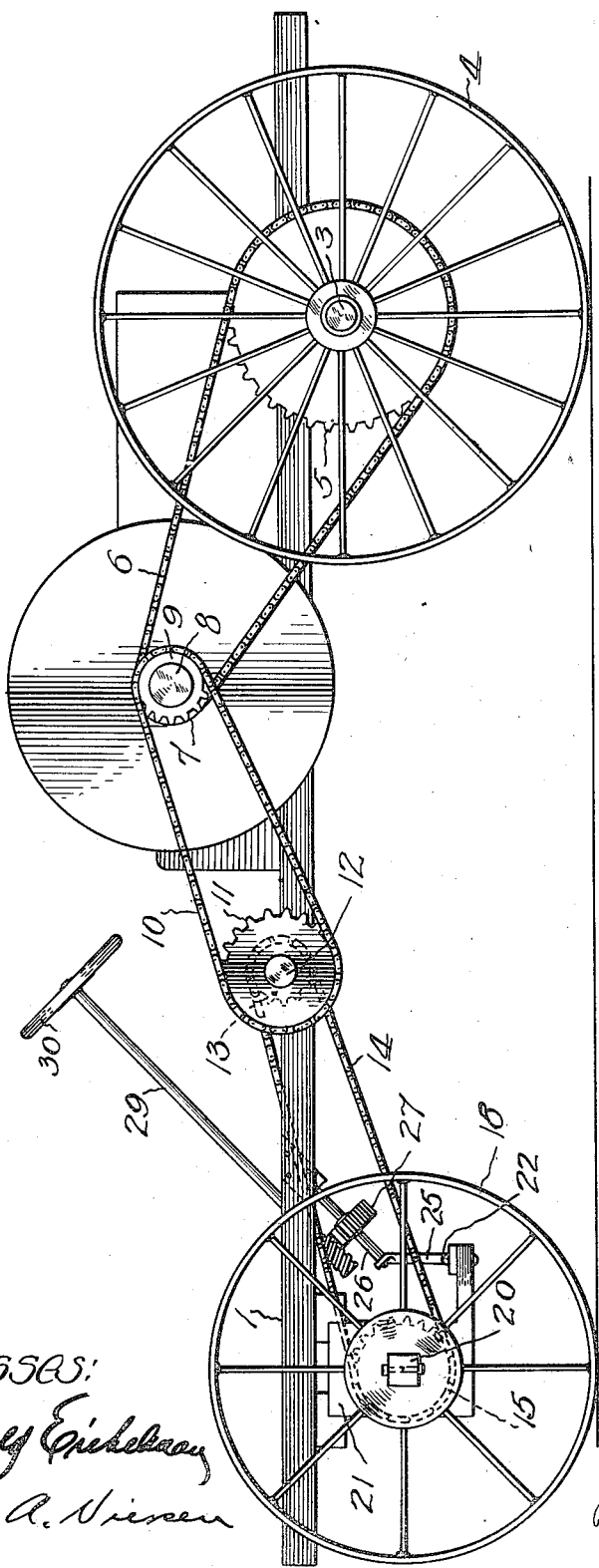

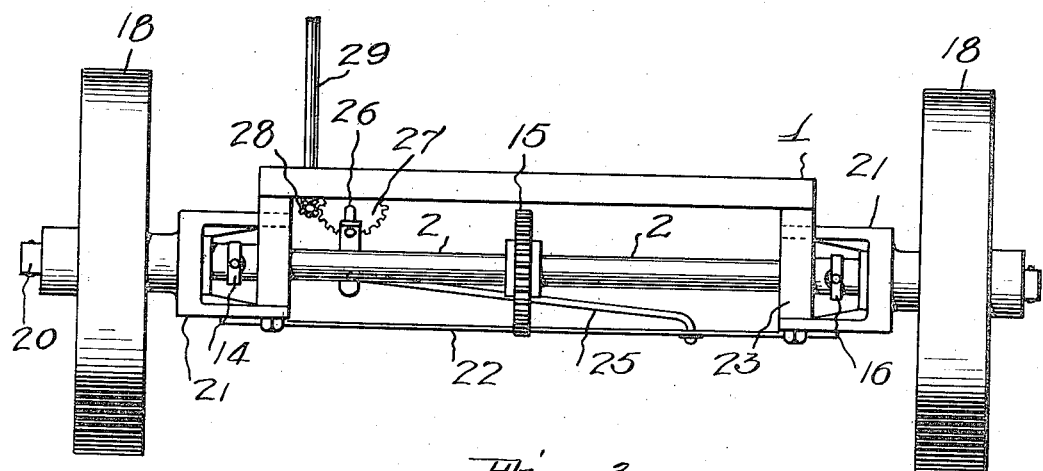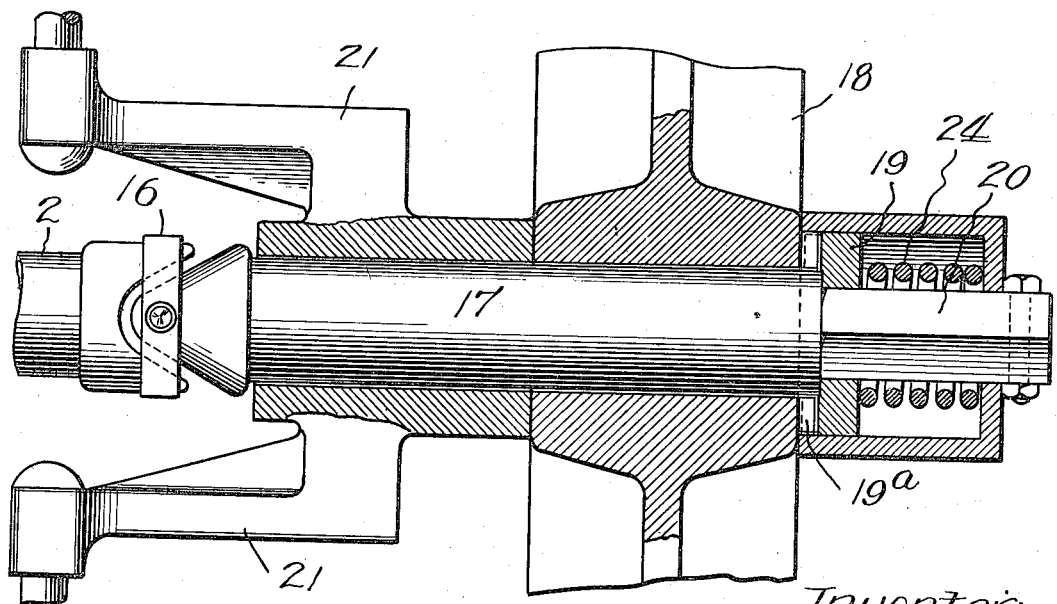

UNITED STATES PATENT OFFICE.

CHRISTIAN H. BROCKMANN, OF UNION CENTER, WISCONSIN.

MOTOR-DRIVEN VEHICLE.

1,237,288.   Specification of Letters Patent.   Patented Aug. 21, 1917.

Application filed December 22, 1916. Serial No. 138,389.

*To all whom it may concern:*

Be it known that I, CHRISTIAN H. BROCKMANN, a citizen of the United States, residing at Union Center, in the county of Juneau and State of Wisconsin, have invented certain new and useful Improvements in Motor-Driven Vehicles, of which the following is a specification.

This invention relates to improvements in motor driven vehicles and more particularly to those of the four drive wheel class, in which the power is administered to all four of the supporting wheels of the vehicle. A further object of the invention is to provide a vehicle of this class adapted primarily for use as a farm tractor and which is so constructed mechanically as to make unneccessary the use of the standard differential. A further object is to provide a device of this class that is simple in construction and operation, not easily put out of order and that is cheap to manufacture. With the foregoing and other objects in view the invention consists in the combination and arrangement of parts to be hereafter fully described in this specification, pointed out in the appended claims and illustrated in the accompanying drawings which form a part of the specification and in which—

Figure 1 is a view of my improved vehicle in side elevation.

Fig. 2 is a front view of the vehicle with part of the driving and steering mechanism eliminated.

Fig. 3 is an enlarged sectional fragmentary view showing the means employed in lieu of a differential.

Fig. 4 is a top plan view of Fig. 3.

Fig. 5 is a schematic view of the steering mechanism used in one embodiment of my invention.

Fig. 6 is a schematic view of a modified form of steering mechanism that may be used to permit a quicker and shorter turn to be made with less movement of the wheel.

Fig. 7 is a fragmentary view of the steering mechanism showing the construction modified to permit a quick short turn.

Like reference characters denote corresponding parts throughout the several views.

The reference numeral 1 denotes the frame of the vehicle which is carried upon the front axle 2 and rear axle 3. The rear axle 3 is provided with the traction wheels 4 fast upon its ends and said axle, further, is provided with a sprocket 5 that is driven by a sprocket chain 6 that runs over a small sprocket wheel 7 arranged upon the engine shaft 8 which shaft is also provided with a sprocket wheel 9 that is connected by sprocket chain 10 to another sprocket wheel 11 fast upon a transmission shaft 12 journaled in suitable bearings carried by the said frame 1. Another sprocket wheel 13 also fast upon said transmission shaft is connected by chain 14 with a sprocket wheel 15 fast upon the front axle 2. The said front axle 2 is connected at each end by a universal joint 16 to a stub shaft 17 upon which a front wheel 18 is carried which wheel, while the vehicle is running in a straight line, is made fast to the axle by a slip clutch or toothed disk 19 which directly connects teeth 19ª of the wheel with the end 20 of the stub shaft which end is square in cross section and, as it rotates, rotates the said clutch 19 which turns and drives the wheel.

A steering knuckle 21 is mounted upon the stub shaft and said knuckles, one upon each stub shaft, are connected by a steering bar 22 and are pivotally connected to bearings 23 that depend from the frame 1. When the front end of the vehicle is turning and the outer front wheel needs to run faster than the stub axle and clutch the teeth 19ª of the wheel force the slip clutch into the wheel hub against the tension of the spring 24 and so permit the said front wheel to travel at the speed necessary to make the turn without slipping.

The bar 22 is connected by pitman 25 with the shaft 26, supported by the frame 1, which shaft through the medium of pinion 27 in mesh with worm 28 of steering shaft 29 is driven by said shaft 29; shaft 29 being controlled by steering wheel 30. The steering knuckle 21 is a one-piece casting as illustrated in the first four figures of the drawing. In Fig. 7 I illustrate a modified form of steering knuckle which comprises the wing 31 which is pivotally connected to the bearings 23 and also pivotally connected at 31ª to the sleeve 32 arranged upon the stub shaft 17 the square end 20 of which is all that is shown in the figure. The sleeve is formed with the ear 33 which is perforated to receive the end of the bar 22. It is obvious that in this construction a quicker and shorter turn of the wheel is possible than in the form previously described. A schematic view of the advantage gained is shown in Fig. 6.

What is claimed is:—

1. In a motor driven vehicle, a motor driven front axle, stub axles having one of their ends square in cross section, universal joints connecting said stub axles with said front axle, traction wheels arranged upon said stub axles, teeth formed in one lateral face of each of said traction wheels, disks fast upon the square ends of said stub axles and formed with teeth kept yieldingly in engagement with the teeth of said traction wheels, steering knuckles arranged upon said stub axles and abutting said traction wheels, and manually operable means for controlling said steering knuckles.

2. In a motor driven vehicle, a motor driven front axle, stub axles having one of their ends square in cross section, universal joints connecting said stub axles with said front axle, traction wheels arranged upon said stub axles, teeth formed in one lateral face of each of said traction wheels, disks fast upon the squared ends of said stub axles and formed with teeth kept yieldingly in engagement with the teeth of said traction wheels, sleeves arranged upon said stub shafts abutting said traction wheels, ears formed integral with said sleeves, a steering rod connecting the ears of said sleeves, wings pivotally connected to said sleeves and to the frame of the vehicle, and manually operable means for controlling said steering rod.

In testimony that I claim the foregoing as my own I have hereto affixed my signature in the presence of two subscribing witnesses.

CHRISTIAN H. BROCKMANN.

Witnesses:
   Carl Herrewig,
   E. G. Nawsha.